April 26, 1960
J. I. KOVALSKY
2,933,903
COOLING SYSTEM FOR ELECTRONIC APPARATUS
Filed Jan. 21, 1958
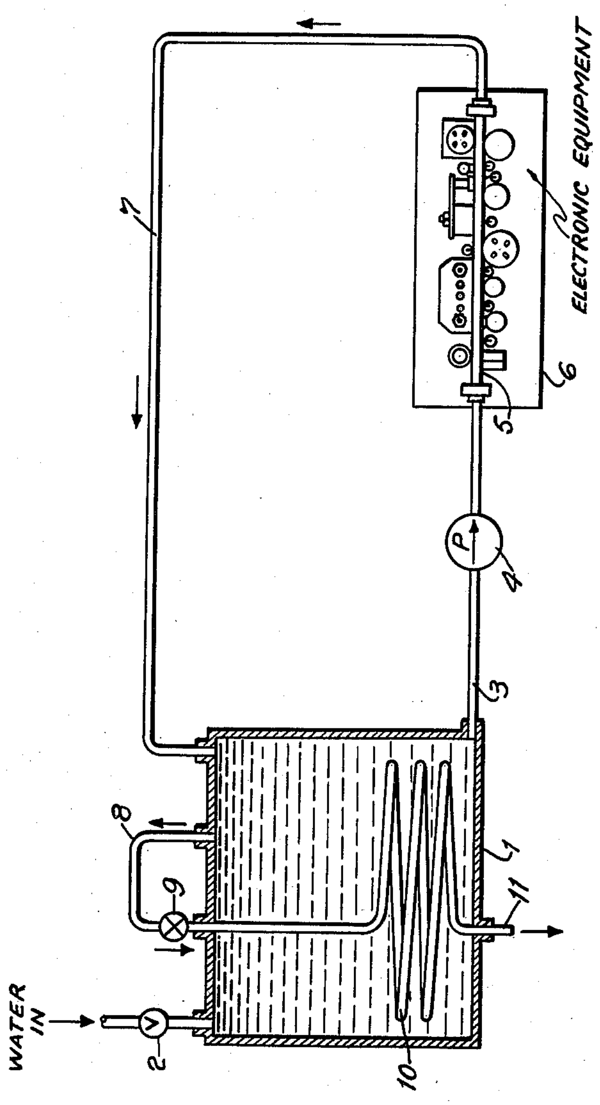
Inventor
JEAN I. KOVALSKY
By Percy P. Lantzy
Attorney United States Patent Office 2,933,903

Patented Apr. 26, 1960

2,933,903

COOLING SYSTEM FOR ELECTRONIC APPARATUS

Jean I. Kovalsky, New York, N.Y., assignor to International Telephone and Telegraph Corporation, Nutley, N.J., a corporation of Maryland Application January 21, 1958, Serial No. 710,356

4 Claims. (Cl. 62—222)

This invention refers to a cooling system for heat producing apparatus and more particularly to the cooling of electronic equipment.

In present day applications of electronic equipment, the trend is towards smaller and more compact units especially in equipment designed for aircraft where one of the major objectives is to obtain a maximum amount of equipment in the smallest space and with the least weight. This more compact packaging creates greater heat dissipation requirements in a smaller volume, and it is therefore necessary to provide conductive cooling equipment to hold the temperature increase in the equipment within predetermined limits and thereby insure efficient operation of the equipment. Cooling systems have been devised which incorporate cooling techniques but they have the disadvantage of being unable to prevent liquid particles being carried off with the vapor in the exhaust. There is also the requirement in missile apparatus that the equipment be operable within a certain limited time, that is, during the flight of the missile until it reaches the target. Also, in aircraft it is only necessary to provide for cooling the electronic equipment therein during the time of actual flight when the equipment is in use. It is required, therefore, to have a cooling system for such types of electronic equipment which operate during a predetermined time interval and at the expiration of that time, the coolant used in such cooling equipment must be replenished. Such a cooling system may be termed a "one-shot" affair wherein sufficient coolant is provided to allow for the operation of the equipment during a certain time and is progressively discharged from the cooling system during that time until it is entirely used up at the expiration of the operating time of the equipment, which is equivalent to the flight time of the aircraft.

It is therefore an object of this invention to provide a cooling system which is adapted for the cooling of aircraft electronic equipment.

It is a further object of this invention to provide a cooling system which is operable for a predetermined time interval determined by the flying time of the aircraft or a missile containing such cooling equipment.

A feature of this invention is the provision of a cooling system for heat producing apparatus that comprises a fluid coolant, means to store the fluid, and means to circulate the fluid in heat exchange relation with the apparatus to effect transfer of heat from the apparatus to the fluid. Means are also provided to expansively exhause the fluid from the storage means when the fluid has been heated to a given temperature and the pressure within the storage means is at the saturation pressure for the given temperature. Means are coupled to the exhaust means to pass the exhausted fluid in heat exchange relation with the fluid in the storage means to effect transfer of heat from the fluid in the storage means to the exhausted fluid.

A further feature is that during the cooling process the fluid coolant is progressively discharged from the cooling system after it passes through a heat exchange and absorbs heat from the fluid in the storage means.

The above-mentioned and other features and objects of this invention will become more apparent by reference to the sole figure of this invention; wherein the cooling system is shown to include a fluid storage tank 1. The fluid coolant, in this case water, is introduced into the storage tank 1 by means of the in-take valve 2. At the bottom of the tank is a discharge pipe 3 which feeds the water into a pump 4 which forces the water through a heat exchange device 5 of electronic equipment 6. This heat exchange device may be a plate similar to the fluid cooling chassis for electronic components described in the pending application of Stephan R. Wagner, Serial No. 674,109. It is to be understood however that other heat exchange means may be used. This chassis comprises fluid passageways so that when fluid coolant is forced through, it will absorb heat from the electronic components mounted on both sides of the plate 5. On leaving the plate 5, the coolant fluid is recirculated back to the storage tank 1 by means of pipe 7 which enters the tank at the top thereof. A U-shaped pipe 8 is fastened to the top of the tank 1 and permits the fluid coolant to emerge from the tank and pass through an expansion valve 9 of the pressure responsive type. The fluid emerging from the expansion valve 9 passes through the heat exchange coils 10 which are disposed within the tank 1 and is in heat exchange relation with the fluid within the tank 1. It is to be understood that the expansion valve 9 may be disposed within the tank 1 and the fluid may pass directly therein. After passing through the coils 10, the fluid coolant emerges from the tank through pipe 11 and is discharged from the cooling system.

In the operation of the coolant system, sufficient fluid coolant is provided which is adequate for the operation of this system for a predetermined time such as the flight time of an airplane or a missile, flying, for example, at substantially 70,000 feet altitude where the atmospheric pressure is .68 p.s.i.a. and the temperature is −67° F. Of course, if used for cooling missile equipment, the tank can be designed large enough to hold the desired amount of coolant fluid, as the missile is necessarily a "one-shot" affair and cannot be used after one firing. For an airplane, since the time of the flight may vary according to the distance to be traversed, the tank can be made large enough to accommodate the required amount of fluid for the estimated longest flight. After the required amount of coolant is injected into the tank, the valve 2 is closed. When the electronic equipment is put into operation and the pump 4 commences to circulate the water through the plate 5 and back again to the tank 1, the fluid coolant constantly absorbs heat from the electronic equipment 6 as it passes through the plate 5. Since the system is a closed system, the temperature of the fluid coolant increases until it reaches a given temperature at which it will boil at the saturation pressure for that given temperature. This pressure is determined by presetting the pressure adjustment of the expansion valve 9 at which the valve 9 will open to permit the passage therethrough of the fluid coolant from the storage tank 1 through the pipe 8. The determination of this given temperature and the saturation pressure therefor is controlled by the desired operating characteristics of the electronic equipment 6. To gain the maximum cooling efficiency, the given temperature should be set as high as possible so that the number of B.t.u.'s of heat absorbed from the equipment will be greater. The system with the highest cooling capacity is the one with the temperature of the heat producing apparatus set as high as possible and with the fluid coolant exhausted at as low a pressure as is practicable. The fluid coolant, however, should not be ejected as a liquid, but preferably as saturated vapor.

If we assume a "one-shot" affair, as a missile, and the maximum temperature of the electronic equipment therein is to be held to 125° C. or 257° F., then it should be possible to keep the operating temperature of the equipment for the relatively short time required at about 250° F. The saturation pressure for that temperature is approximately 30 lbs. per square inch. The pressure adjustment of the expansion valve 9 is therefore set for 30 lbs. per square inch. The fluid coolant is injected into the tank at room temperature of approximately 70° F. and for a missile the equipment is so designed that the tank and the associated piping will hold the required amount of fluid. As the equipment operates, the fluid coolant absorbs heat therefrom as it circulates through the electronic equipment 6. The temperature of the fluid increases until it reaches 250° F. At that temperature and a pressure of 30 lbs. per square inch, the water begins to boil. This temperature will continue at the pressure so long as any water remains in the liquid state.

At the pressure of 30 lbs. per square inch, the expansion valve 9 opens and permits the fluid coolant to pass through. The fluid that passes through the expansion valve is steam with some water in suspension. The fluid escapes at high pressure through the expansion valve 9 and will decompress to a pressure of approximately 1 lb. per square inch and the temperature of the fluid will drop to 100° F. This expansion is a constant enthalpy process, as no shaft work is done on or by the fluid and the process is one of pure throttling. Across the valve the mixture of water and vapor is at a much lower temperature and the boiling pressure for that temperature, that is, 100° F. and 1 lb. per square inch pressure. This mixture of water and vapor then passes through the heat exchange coils 10 and absorbs heat from the 250° F. fluid within the tank 1. The temperature of the exhaust fluid within the coils 10 can easily reach 150° F. at the pressure of 1 lb. per square inch, which at that pressure indicates that the exhaust fluid is saturated vapor. The fluid is then discharged from the coils 10 at 150° F. and 1 lb. per square inch pressure. This pressure is approximately more than the atmospheric pressure at an altitude of 70 thousand feet. It is always possible to exhaust the fluid from the missile or aircraft at such a pressure in spite of the increase in relative stagnation pressure with the velocity of the aircraft.

The pressure in the tank 1 is above discharge pressure, therefore the fluid expanded through valve 9 is at a lower temperature than the temperature of the fluid in the tank 1. This explains why the expanded fluid is passed in heat exchange relation with the fluid in the tank. The expanded fluid will have its temperature raised to a value which can be made to approach the temperature of the liquid contained in tank 1 by increasing the size of the heat exchanger 10. The temperature of 150° F. used in the preceding discussion in a compromise temperature determined by an economic size of the heat exchanger 10. The increase in temperature of the expanded fluid within exchanger 10 is a consequence of a thermal energy transfer from the fluid in tank 1 to the expanded fluid in exchanger 10.

The amount of energy thus transferred varies as a function of the pressure drop above mentioned, and also as a function of the quality of the fluid which would otherwise be exhausted to the environmental discharge atmosphere. This process tends to exhaust a fluid with the highest possible internal energy so that it is used to the maximum for cooling.

For an airplane where repeated flights are made and the electronic equipment must necessarily have a longer operating life, it is advisable to keep the temperature of the operating equipment at a lower temperature than the maximum permissible or 257° F. This operating temperature will only be determined by the life requirements of the equipment. The same procedure as explained for the operation of the missible will, of course, be used for the airplane electronic equipment but the given temperature and the saturation pressure for that temperature will be set as may be required. The operation, of course, will proceed in the same manner until all of the fluid is exhausted from the cooling system which, of course, should be within the time required for the flight duration. In both cases, there should be no discharge of liquid from the cooling system but only of the saturated vapor, or better, over-saturated vapor at the pressure of the surrounding atmosphere.

A great advantage is that such a system is much less sensitive to the motions of the aircraft as it does not depend upon gravity to exhaust only fluid when the fluid has a high internal energy.

While I have described above the principles of my invention in connection with specific apparatus, it is to be clearly understood that this description is made only by way of example and not as a limitation to the scope of my invention as set forth in the objects thereof and in the accompanying claims.

I claim:

1. A one shot cooling system for heat producing apparatus operable for a predetermined time comprising, means to store a quantity of coolant fluid sufficient to operate said cooling system for said predetermined period of time, a first heat exchange device in contact relation with said apparatus, means to circulate said fluid from said storage means through said first heat exchange device to effect transfer of heat from said apparatus to said fluid and to heat said fluid to a given temperature corresponding to the saturation pressure for said temperature, an expansion valve responsive to said saturation pressure to open and expansively exhaust said fluid therethrough, a second heat exchange device coupled to the output of said valve whereby when said fluid is expansively exhausted through said expansion valve said fluid passes through said second heat exchange device to effect transfer of heat from said fluid within said storage means to said exhausted fluid, and means to progressively discharge said fluid from said second heat transfer device and from said cooling system until said quantity of fluid is used up.

2. A one shot cooling system for heat apparatus operable for a predetermined time comprising a fluid coolant, means to store a quantity of coolant fluid sufficient to operate said system for said predetermined period of time, a first heat exchange device in contact relation with said apparatus, means to circulate said fluid from said storage means through said first heat exchange device to effect transfer of heat from said apparatus to said fluid and to heat said fluid to a given temperature corresponding to the saturation pressure for said temperature, an expansion valve responsive to said saturation pressure to open and expansively exhaust said fluid therethrough, means coupling said valve to said storage means, a second heat exchange device coupled to the output of said valve, whereby when said fluid is expansively exhausted through said expansion valve said fluid passes through said second heat exchange device to effect transfer of heat from said fluid within said storage means to said exhausted fluid, and means to progressively discharge said fluid from said second heat transfer device and from said cooling system until said quantity of fluid is used up.

3. A one shot cooling system for heat producing apparatus operable for a predetermined time comprising a fluid coolant, means to store a quantity of coolant fluid sufficient to operate said system for said predetermined period of time, a first heat exchange device in contact relation with said apparatus, means to circulate said fluid of said storage means to and from said first heat exchange device to said storage means whereby said fluid is circulated from said storage means through said first heat exchange device to effect transfer of heat from said apparatus to said fluid and to heat said fluid to a given temperature corresponding to the saturation pressure for said temperature, an expansion valve responsive to said saturation pressure to open and expansively exhaust said fluid therethrough, means coupling said valve to said storage means, a second heat exchange device coupled to the output of said valve, means disposing said second heat exchange device within said storage means in contact relation with said fluid therein whereby when said fluid is expansively exhausted through said expansion valve said fluid passes through said second heat exchange device to effect transfer of heat from said fluid within said storage means to said exhausted fluid, and means to progressively discharge said fluid from said second heat transfer device and from said cooling system until said quantity of fluid is used up.

4. A one shot cooling system for heat producing apparatus operable for a predetermined time comprising a fluid coolant, means to store a quantity of coolant fluid sufficient to operate said system for said predetermined period of time, a first heat exchange device in contact relation with said apparatus, a pump coupling said first heat exchange device to said storage means to force said fluid through said first heat exchange device, means to return said fluid from said first heat exchange device to said storage means whereby said fluid is circulated from said storage means through said first heat exchange device to effect transfer of heat from said apparatus to said fluid and to heat said fluid to a given temperature corresponding to the saturation pressure for said temperature, an expansion valve responsive to said saturation pressure to open and expansively exhaust said fluid therethrough, means coupling said valve to said storage means, a second heat exchange device coupled to the output of said valve, means disposing said second heat exchange device within said storage means in contact relation with said fluid therein whereby when said fluid is expansively exhausted through said expansion valve said fluid passes through said second heat exchange device to effect transfer of heat from said fluid within said storage means to said exhausted fluid, and means to progressively discharge said fluid from said second heat transfer device and from said cooling system until said quantity of fluid is used up.

References Cited in the file of this patent

UNITED STATES PATENTS

| | | |
|---|---|---|
| 2,148,571 | Meyerhoefer | Feb. 28, 1939 |
| 2,312,292 | Tyson | Feb. 23, 1943 |
| 2,538,664 | Benz | Jan. 16, 1951 |
| 2,756,027 | Hutchings | July 24, 1956 |
| 2,848,879 | Hesson | Aug. 26, 1958 |